United States Patent [19]

Barrett et al.

[11] 4,183,453

[45] Jan. 15, 1980

[54] ELECTRONICALLY OPERATED PORTABLE FASTENER DRIVING TOOL

[75] Inventors: Edward E. Barrett, Massapequa Park; Albert Lensky, New York; Paul Olesen, Bellmore; Christian F. Becker, Larchmont; Morris Pinczewski, New York; Wilfredo Febre, Rego Park; Steven Hahn, East Hampton, all of N.Y.

[73] Assignee: Swingline, Inc., Long Island City, N.Y.

[21] Appl. No.: 880,846

[22] Filed: Feb. 23, 1978

[30] Foreign Application Priority Data

Apr. 10, 1977 [GB] United Kingdom ............... 41280/77

[51] Int. Cl.² ................................................ B25C 5/06
[52] U.S. Cl. ..................................... 227/131; 227/120
[58] Field of Search ................ 173/117; 227/121, 131, 227/114, 115, 116, 120

[56] References Cited

U.S. PATENT DOCUMENTS

| 3,179,866 | 4/1965 | Doyle et al. | 318/125 |
| 3,215,864 | 11/1965 | Doyle et al. | 307/88.5 |
| 3,267,337 | 8/1966 | Doyle et al. | 317/148.5 |
| 3,281,046 | 10/1966 | Boulay | 227/121 |
| 3,552,627 | 1/1971 | Moreno | 227/121 |
| 3,589,587 | 6/1971 | Manganaro | 227/131 |
| 3,786,978 | 1/1974 | Manganaro | 227/131 |
| 3,893,610 | 7/1975 | Smith | 227/116 |
| 3,971,969 | 7/1976 | Wines et al. | 310/30 |
| 4,005,812 | 2/1977 | Doyle et al. | 227/131 |
| 4,033,500 | 7/1977 | Manganaro | 227/131 |

OTHER PUBLICATIONS

General Electric SCR Manual, Fifth Edition, pp. 202-203, 1972.

Primary Examiner—John McQuade
Attorney, Agent, or Firm—Pennie & Edmonds

[57] ABSTRACT

An electronically operated portable fastener driving tool is disclosed. Fasteners are driven into a workpiece by a driver blade which is actuated by a solenoid powered by a source of alternating current. Each actuation of the device produces a predetermined plurality of driving strokes being delivered to a fastener. The tool is also provided with means for preventing more than one fastener from being driven during each actuation of the tool.

12 Claims, 10 Drawing Figures

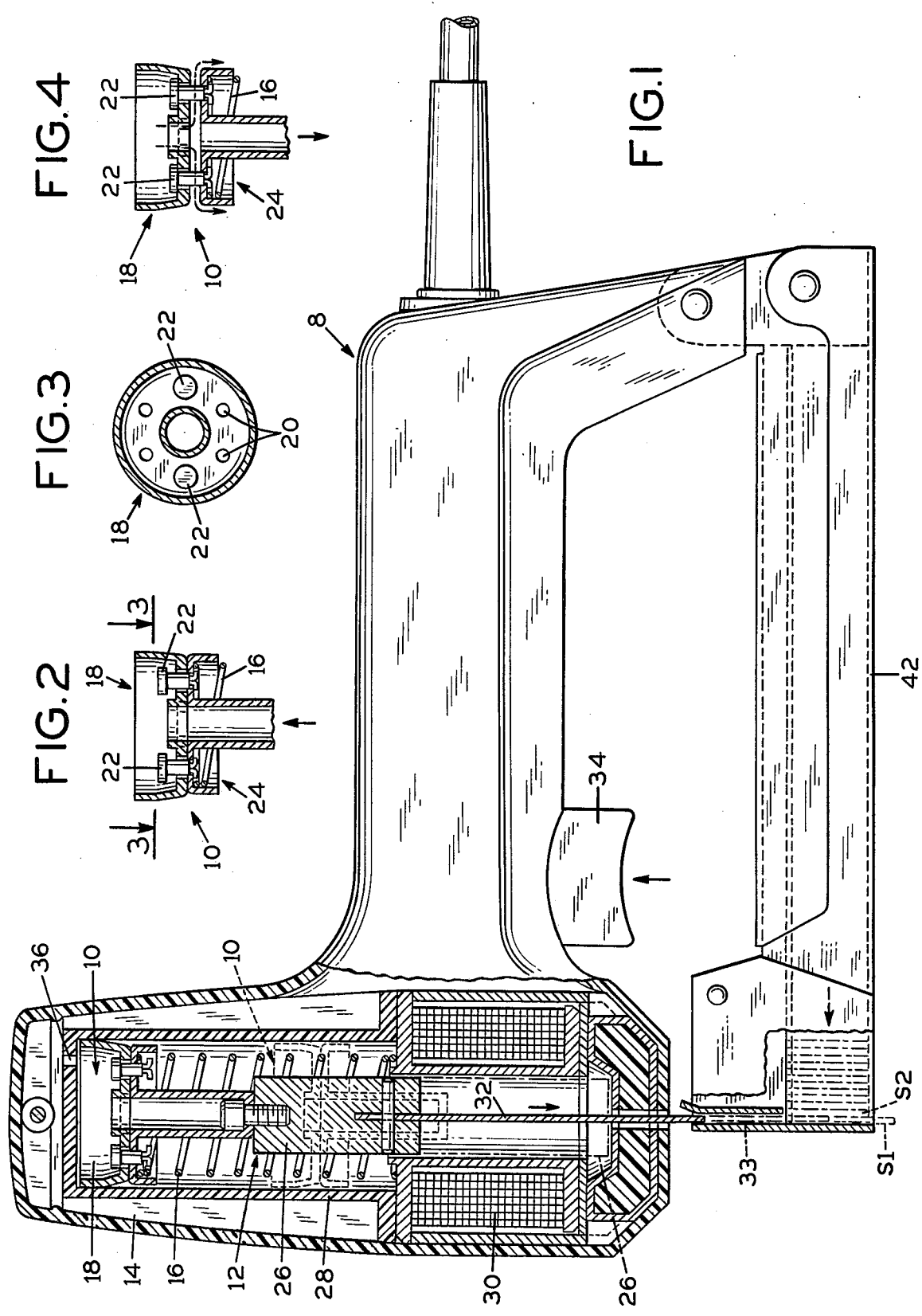

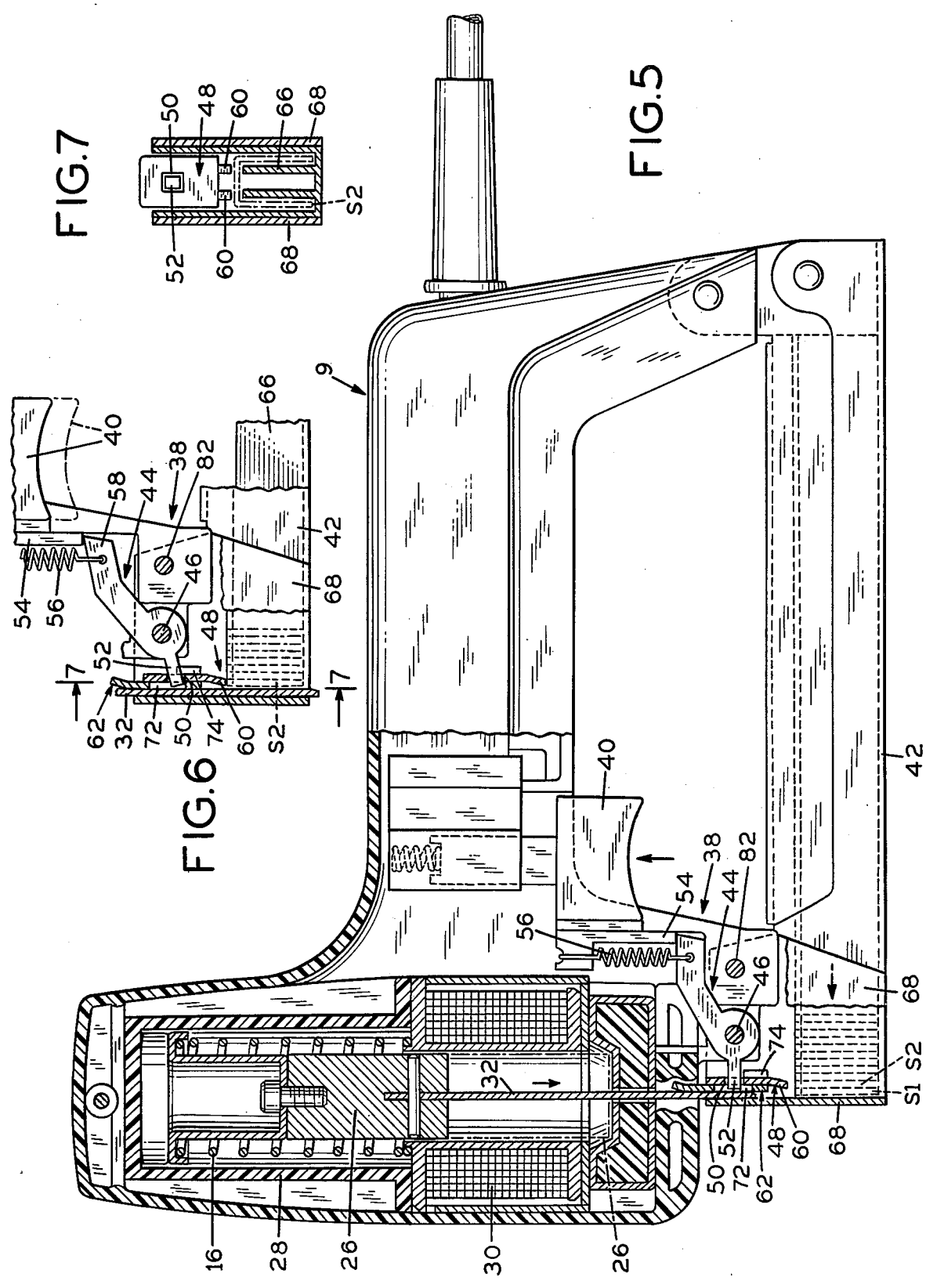

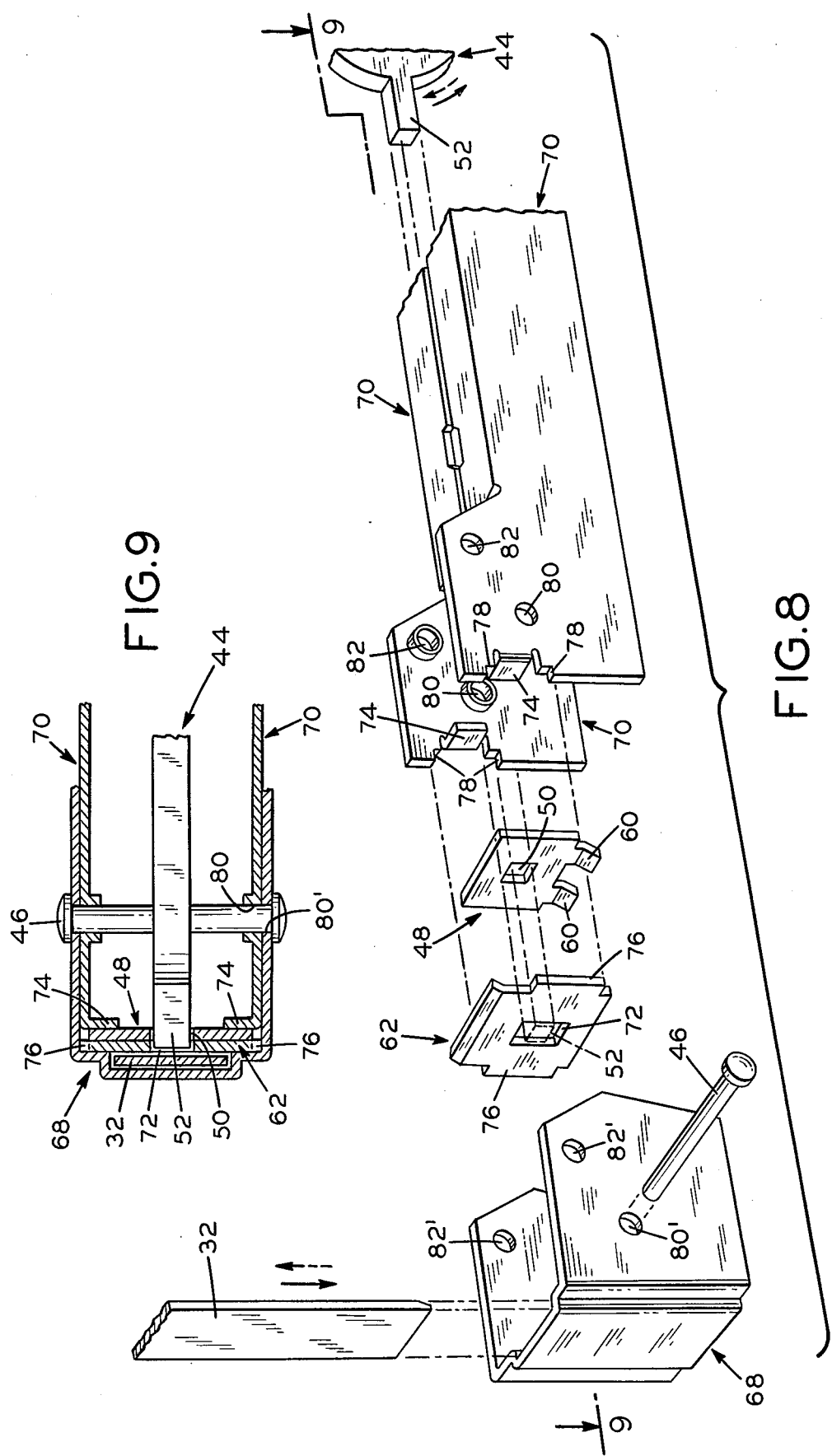

ELECTRONICALLY OPERATED PORTABLE FASTENER DRIVING TOOL

BACKGROUND OF THE INVENTION

This invention relates to electrically operated fastener driving tools and, more particularly, to devices of this type which are provided with electronic control circuitry for supplying a predetermined plurality of unidirectional electronic impulses to a solenoid which powers the fastener driving blade of the device. This results in the delivery of a like number of driving strokes to a single fastener for each actuation of the tool. Means is also provided for preventing the advancement of more than one fastener into the path of the driver blade during the driving strokes produced in a single actuation of the device.

Electronically operated fastener driving tools are disclosed in U.S. Pat. No. 3,971,969 and in patents cited therein. The cited patent relates to electrically operated stapling devices and, in particular, to devices which are provided with electronic control circuitry for supplying unidirectional electronic impulses for operating the staple driving blade of the device. In the cited patent the driving power is delivered to the blade in two or more pulses corresponding to at least two alternate half-cycles of opposite polarity from an alternating power source.

An electronic trigger circuit is disclosed in the General Electric *SCR Manual*, Fifth Edition, at pp. 202-3 (1972). The GE *SCR Manual* discloses a one-shot trigger control circuit which triggers an SCR for one complete half-cycle only of an AC supply. The *SCR Manual* teaches that the disclosed circuit may be utilized for the solenoid drives of electrically operated tools where load current must flow for one complete half-cycle only to produce a single stroke of a solenoid armature regardless of the length of time the trigger of the device is maintained in the "on" position.

It has been found to be advantageous to operate an electronic fastener driving tool in such a manner that each fastener is driven with more than one stroke of the driver blade. The fastener is thus completely set in the workpiece and less energy is expended per stroke of the driver blade rendering the entire operation quieter and resulting in less wear and tear on the device to thereby extend its useful life. By providing multiple driving strokes to each fastener, penetration of harder working surfaces than that normally possible with single stroke devices is accomplished.

The present invention utilizes circuitry comprising only diodes, resistors, capacitors and a single SCR to provide a predetermined plurality of unidirectional current pulses to the solenoid during consecutive like-poled half-cycles of alternating current so that the driver blade will deliver a predetermined plurality of driving strokes, preferably two, for a single actuation of the tool. Alternative mechanical means are also provided, responsive to the activating mechanism of the tool, to prevent more than one fastener, in a strip of fasteners, for example, from being advanced into the path of the driver blade during a single actuation of the tool. In one embodiment, a damper assembly, also referred to herein as a dashpot assembly, is disclosed in which the return of the driver blade to its normal rest position is restrained and the driver blade itself prevents the travel of the following fasteners into the drive track. In an alternative embodiment, a clamping assembly responsive to the actuation of trigger means physically clamps down on the first following fastener and prevents its movement into the drive track. By either of these alternative mechanical means there is prevented the possibility of more than one fastener from being driven as a result of the multiple stroke action of the driver blade.

BRIEF DESCRIPTION OF THE DRAWINGS

FIG. 1 is a side elevation of the electronic fastener driving assembly with parts broken away and in section.

FIG. 2 is a fragmentary view of the dashpot seated against the plunger cap moving upward.

FIG. 3 is a plan view in section through the dashpot taken along lines 3—3 of FIG. 2.

FIG. 4 is a fragmentary view of the dashpot showing the parts separated while moving in the downward position.

FIG. 5 is a side view of another embodiment of the stapler showing the clamping assembly with the clamp in its raised position.

FIG. 6 is a fragmentary view of the staple clamp assembly in locked position during operation of the trigger switch.

FIG. 7 is a vertical section taken substantially along lines 7—7 of FIG. 6 showing the clamp.

FIG. 8 is an exploded view in perspective showing the interrelationship of the driver blade, the clamping assembly and forward portion of the magazine section of the device.

FIG. 9 is a horizontal plan view taken generally along line 9—9 of FIG. 8 showing the various components assembled.

DETAILED DESCRIPTION OF THE PREFERRED EMBODIMENT

Electronic Circuitry

Figure 10:
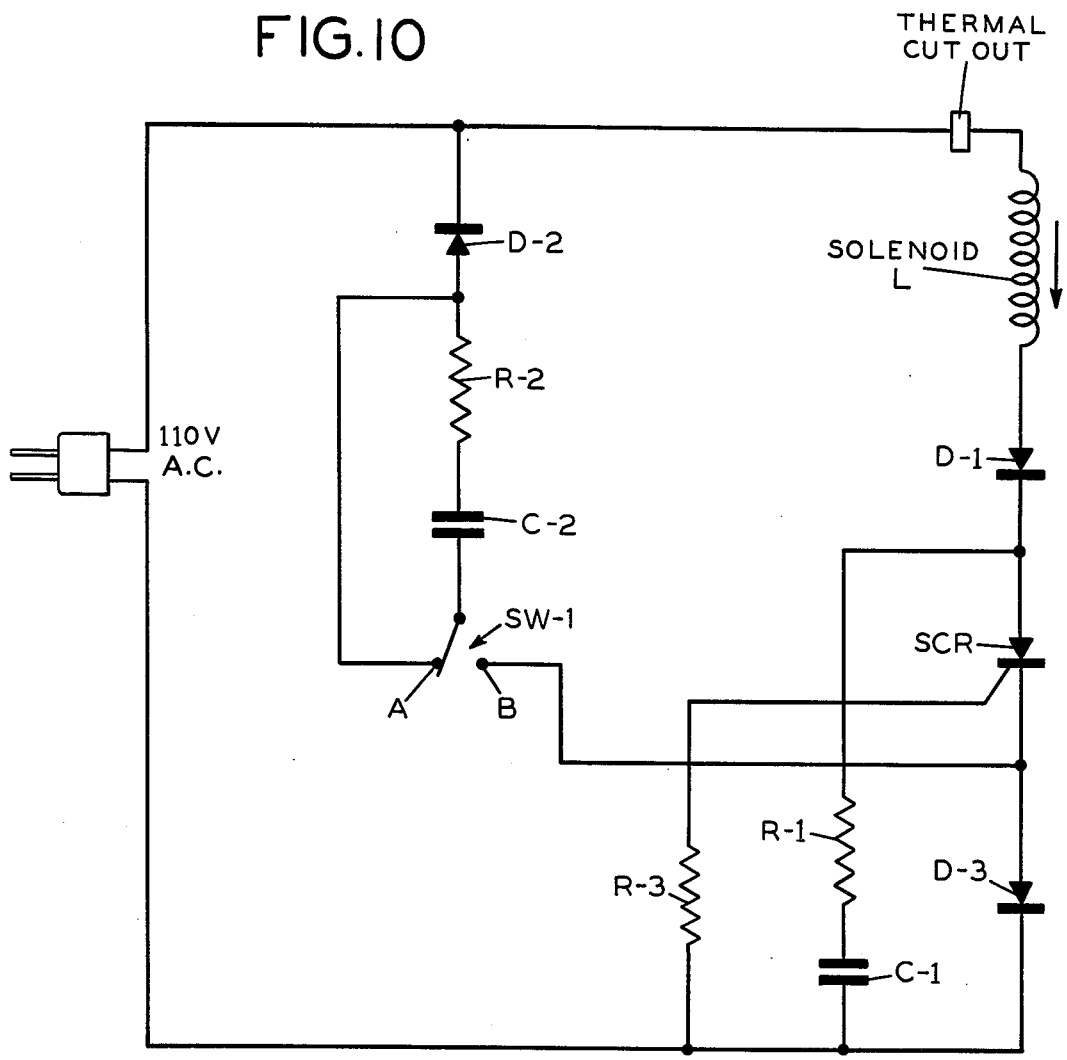
FIG. 10 is a schematic circuit diagram of an electronic pulsing circuit constructed in accordance with the present invention.

The electronic fastener is actuated by an electromagnetic triggering circuit with passive crossover detection and programmable pulse capability powered by an AC source of energy.

The AC circuit comprises a coil as well as nine components. These nine components consist of a reverse blocking triode thyristor such as a silicon controlled rectifier (SCR) and eight components including three diodes, three resistors and two capacitors.

The circuit relies on zero crossing detection for firing the SCR, but does so without the use of well-known phase shift or voltage comparator techniques. In order to obtain zero crossing data for the SCR, this circuit uses two passive RC newtorks in which the component values are selected so that their time constants determine that the SCR will be fired a predetermined number of times, but under all circumstances more than once, during repeated like-poled half-cycles of alternating current. No transistors are used in this triggering circuit other than the firing SCR.

By altering the electrical values of the components in the two RC networks to alter their time constants it becomes possible to program this circuit in such a way that it will deliver a predetermined number of half-cycle pulses. During each of these half-cycles the SCR is fired and, in turn, the coil is energized a corresponding number of times. Thus, when the trigger of the staple gun is activated, this circuit will deliver a preprogrammed number of pulses and then shut off regardless of the length of time the trigger is activated. In order for the circuit to deliver a subsequent sequence of pulses the trigger switch has to be released and reactivated.

Referring to FIG. 10, the operation of the circuit after it is connected to a standard 110 volt source of alternating current, is as follows:

1. With the switch, SW1, in position A (nonactuated) during the first positive half cycle of the AC source, current flows through the series path which consists of the solenoid load L, diode D1, and the R1C1 network. Although the resistance of the solenoid is only approximately 2 ohms, R1 is a 680 ohm resistor, so that there will be very little current in the loop. Therefore, the current passing through the solenoid will be much smaller than required to create a sufficient magnetic field to reciprocate its armature, plunger assembly 26, shown in FIGS. 1 and 5. During this positive half cycle, the capacitor of the R1C1 network is charged and it becomes fully charged approximately by the time the AC sign wave reaches its maximum amplitude. With the switch still in its nonactuated position, the R2C2 network is open-circuited.

2. During the negative half cycle diodes D1 and D3 block the flow of current through the solenoid and the SCR is not conducting. The R2C2 network continues to be open-circuited.

3. When the switch is placed in position B (actuation) by actuation of a trigger which may be either trigger 34, illustrated in FIG. 1, or trigger 40, illustrated in FIG. 5, the R2C2 network is connected to the SCR and creates another loop for the flow of current. If the switch is changed to position B during the positive half cycle, current will not flow through the R2C2 network because it is blocked by diode 2.

4. During the negative half cycle of the AC source after the switch is closed, current can flow through the path consisting of resistor R3, the gate of the SCR, the cathode of the SCR, the R2C2 network and diode D2. This current, referred to as gate current, provides a negative current pulse to the SCR which allows the SCR to conduct during the next positive half cycle.

5. During the next positive half cycle, current flows through the solenoid L, diode D1, the SCR and diode D2. At this point, the R1C1 network is shunted so that most of the line voltage appears across the solenoid and, therefore, a large amount of current is allowed to flow in this loop. This current is sufficiently large to allow the coil to actuate the solenoid armature to reciprocate the driver blade. Simultaneously, the R1C1 network provides holding current to the SCR for a sufficient duration to allow the SCR to fire during the next successive positive half cycle.

6. During the negative half cycle between the two firing positive half cycles, no current flows through the solenoid because of diodes D1 and D3. During this intermediate negative half cycle, the biasing spring of the stapler attempts to restore the solenoid armature to its retracted position. By the time the third positive half cycle occurs after the switch is placed in its actuating position, the time constant of the R1C1 network will have sufficiently decayed to no longer provide the necessary holding current to fire the SCR a third time. Consequently, to get the SCR to fire again, the switch will have to be released to allow the R1C1 network to once again recharge and then the switch must be reactivated.

7. Note, that the R2C2 network need provide a signal to the gate only once regardless of the number of times that it is desired to fire the SCR because once this SCR is activated by a pulse of current it will continue to conduct during successive positive half-cycles as long as there is sufficient holding current supplied.

It can be seen from the above that the number of half-cycle repeated firings of the SCR is a function of the SCR holding current and gate current. The necessary holding current of the SCR varies with different SCRs and their parameters are provided by the manufacturer. The time constant of the holding current is determined by the passive network comprising R1 and C1. The gate current of the SCR is also a specification which varies with different SCRs and forms a portion of the manufacturer's specifications. The time constants of the gate current are determined by the passive network comprising R2 and C2. Consequently, by varying the electrical values of the components of these RC networks it becomes possible to program this circuit to fire a predetermined number of times.

It has been found that more advantageous operation of the driver blade of the electronic fastener may be accomplished by using a multiple predetermined number of pulses as the driving energy source. In the preferred embodiment a predetermined number of unidirectional pulses, preferably two, are derived from a like number of successive cycles of the alternating current source.

When the values of the four critical components are selected as shown in Table 1 hereinbelow, the R1C1 network and the R2C2 network function so as to fire the SCR two successive times during two successive cycles of alternating current each time the trigger switch is activated. The values for the components presented in Table 1 and the values which are cited in this and the following two paragraphs are meant to be illustrative rather than exclusive, although this combination of values has been found to be a desirable set in terms of both reliability and cost efficiency. Moreover, the values of the components may be selected so as to produce a number of driving strokes greater than two for each actuation of the device.

Table 1

| Component | Value |
|-----------|-------|
| R1 | 680 Ω |
| C1 | 10 μf |
| R2 | 1,000 Ω |
| C2 | 0.33 μf |

Additionally, the circuit in FIG. 10 utilizes resistor R3 whose resistance is 100 ohms. Resistors R1, R2 and R3 are all ¼ watt (although ½ watt may be used) deposited carbon film resistors having axial leads and maximum working voltages of 250 volts.

Diodes D1 and D3 are both 3 amp silicon diodes, whereas diode D2 is a 750 milliamp silicon diode. All three diodes are rated 200 volts Peak Inverse Voltage.

The SCR used in this application is a plastic silicon controlled rectifier, 200 volts PIV which is capable of handling forward currents between 8 and 12 amps. The peak forward surge current for one half-cycle (8.3 milliseconds) must be able to handle at least 100 amps. The gate trigger current is in the range of 5 milliamps to 30 milliamps at 35 C and the holding current window is in the range of 12 milliamps to 30 milliamps at 25 C. Any of the following devices is satisfactory: Motorola 2N4443, Motorola 2N6396, Unitrode R08037580.

PREFERRED MECHANICAL MODES OF THE INVENTION

Dashpot Assembly

The electronic fastener driving tool of this invention is a multiple stroke device in which a fastener, for example, a staple, receives a predetermined plurality of blows from the driver blade to set it in a workpiece. In a preferred embodiment of the device (dual pulse) each fastener is struck twice by the driver blade. Since it is common practice to continuously urge fasteners into position for being driven, the tool must be provided with means to prevent a second fastener from moving into the driving position while the driver blade is applying a second stroke to the first fastener. Means are provided for accomplishing this by the use of a dashpot assembly which restricts the upward or return movement of the driver blade during the dwell time between its first and second strokes. As a result, the driver blade does not fully retract between the first and second strokes and physically blocks the second fastener, and all others in a following strip of fasteners, from the drive track until the first fastener has been struck twice and is fully set in the workpiece.

The dashpot assembly 10, as shown in FIG. 1, is connected to the armature or plunger assembly 12 of the fastener tool 8 and moves vertically within the body cavity 14 of the head portion thereof together with and in response to the movement of the armature assembly 12 which is upwardly biased by resilient means such as tension spring 16. The dashpot assembly comprises a cup-shaped device 18, shown in detail in FIG. 2, which is preferably made of a plastic material such as low density polyethylene. There is provided a plurality of holes 20 at the bottom surface of the cup, shown in FIG. 3, to provide for the flow of air therethrough during movement of the device in response to actuation of the tool. The dashpot cup is loosely connected by tubular shoulder rivets 22 to a plunger cap 24 which, in turn, is connected to the plunger 26 of the armature assembly. The plunger cap serves both to retain the spring 16 which upwardly biases the armature assembly and to close the holes 20 during upward movement of the armature. In operation, the plunger is drawn into the solenoid 30 upon activation of the device by actuation of trigger 34. The dashpot cup 18 is designed to fit snugly but slidably within the circumferential wall of a cylindrically-shaped interior enclosure 28 which fits within the body cavity 14 and rests on the upper end of solenoid 30. Upward or return movement of the dashpot cup 18 within the interior enclosure 28, or similar enclosure, whether integrally formed with the body of the tool or separately enclosed as in the present embodiment, causes frictional and air pressure resistance that retards its upward travel and, consequently, the upward movement of the plunger assembly to which it is connected. Full retraction of the driver blade 32 which is connected to the plunger 26 is thereby prevented during the dwell time between the first and second strokes applied to a fastener in a dual pulse embodiment of the device. As a result, the lower portion of the driver blade 32 physically blocks the following fastener from moving into the driving position beneath the driver blade until the first fastener such as staple S1 has been completely set in a workpiece.

In operation, the dashpot works as follows: during the first pulse of the solenoid which is initiated by actuation of the trigger 34, the plunger moves down into solenoid 30 and the dashpot, due to friction and inertia, hesitates through approximately 0.055 inches provided by the shoulder rivets which connect the dashpot to the plunger cap as shown in FIG. 4. This provides a gap between the plunger cap 24 and the bottom of dashpot 18 which allows air to rush through the holes 20 in the bottom of the dashpot cup so that the plunger is unrestricted on its downward stroke. During the dwell between pulses, the return spring moves the plunger cap 24 up against the dashpot cup, closing the holes 20 and compressing the air in the body cavity 14. The air pressure in the body cavity works against the return spring and slows the return of the plunger assembly so that the second pulse to the solenoid occurs before the driver blade has reached the top of the next staple S2 in line. Dotted line 33 of FIG. 1 illustrates the approximate return position of the driver blade 32 between strokes in a multiple pulse operation. The driver blade thus physically prevents staple S2 from moving into the drive track. In order that the plunger might return to its initial rest position to drive the following staple S2 after staple S1 has been completely set in a workpiece, the top of the body cavity cylinder is provided with a bleed hole 36 which regulates the rate of upward movement of the dashpot assembly and allows the spring 16 to return the plunger 26 to its initial, upward biased position. The fastener is then ready for the next staple S2 to be driven upon further activation of the device by reactuation of the trigger 34.

Clamping Assembly

An alternative mechanism for preventing a second fastener from entering the path of the driver blade 32 before a first fastener such as staple S1 has been completely set in a workpiece is the clamping assembly 38 which is shown in FIGS. 5–9. The clamping assembly operates mechanically in conjunction with the movement of trigger switch 40 so that when the trigger is squeezed clamp 48 presses down against the next following staple S2 in the magazine 42, pressing it against the staple rail 66 as shown in FIGS. 6 and 7. Staple S2 and those following it in the magazine 42 are thus restrained from forward movement until the trigger switch 40 is released. Upon release of the trigger switch 40, clamp 48 moves upward into the rest position as shown in FIG. 5 and staple S2 is urged forward into the path of the driver blade by a spring (not shown) in the magazine 42.

Clamping assembly 38, shown in detail in FIG. 6, comprises a clamp 48 and a pivotable lever member 44 which is connected to and rotates about pivot 46. Pivotable lever member 44 has two elongated end portions including a forward projecting tang 52 and a rearward projecting arm 58. Tang 52 of pivotable lever member 44 projects through hole 50 which is located generally centrally in clamp 48. As shown in FIGS. 5 and 6, the rearward projecting arm 58 of the pivotable lever member 44 is resiliently connected to a blocking member 54 by resilient means such as spring 56. The blocking member 54 is attached for movement with trigger switch 40. Thus, when trigger switch 40 is squeezed, it is raised from its rest or unactuated position (see FIG. 6, dashed line 40) to its actuated position and blocking member 54 is also raised. Simultaneously, rearward projecting member 58 of said pivotable lever member is caused by spring 56 to be raised and to rotate in a counterclockwise direction about pivot 46. At the same time, tang 52 is rotated in a counterclockwise direction and, because it communicates with clamp 48 through hole 50, moves clamp 48 downward so that it presses staple S2 against staple rail 66. Staple S2 is thus prevented from moving into the path of the driver blade.

As shown in FIG. 7, clamp 48 is provided at its bottom edge with two tangs 60 which are positioned to press against the top of a staple as it rests on the staple rail 66. The tangs 60 are preferably canted forward as shown in FIG. 8. The bottom edge of the tangs 60 are constructed so as to have a horizontal edge which rests flush against the top of the staple. This construction concentrates the pressure of the clamp 48 on the staple pressing it firmly against the tracks of the staple rail.

The interrelationship of the various parts of the clamping assembly and the forward portion of the magazine assembly are shown in an exploded view in perspective in FIG. 8. As illustrated therein, sheath 68 is designed for attachment to the side plates 70 of magazine 42 and defines a portion of the drive path for driver blade 32. The sheath 68 and the side plates 70 are connected by pivot 46 which extends through aligned openings 80 and by a rivet (not shown) which extends through aligned openings 82. Openings 80 and 82 of side plates 70 may, if desired, be provided with inwardly projecting bearing collars.

Enclosed within the sheath 68 are a driver backing plate 62 which is provided with an elongated generally centrally located hole 72, clamp 48 and tang 52 of the pivotable lever member which extends through both hole 50 of clamp 48 and elongated hole 72 of backing plate 62. The elongated hole 72 of the driver backing plate 62 has a width approximating the width of hole 50 but is of a greater length to accommodate rotational movement of tang 52. This permits the driver backing plate 62 to remain stationary while the clamp 48 is moved up and down by tang 52 operation of the device. Backing plate 62 is also prevented from movement by elongated portions 76 which fit within and engage notches 78 of the side plates 70. Tabs 74 which project inward from side plates 70 prevent rearward movement of the clamp 48. A number of the various elements shown in FIG. 8 and referred to above are shown assembled in FIG. 9 which illustrates the interrelationship of these parts.

We claim:

1. In an electrically powered fastener driving tool which provides a multiple stroke drive to a fastener each time the tool is actuated having a hollow body comprising:
 (a) an elongated head portion housing an armature assembly which includes:
  (i) a solenoid,
  (ii) a plunger which fits within and slides axially of said solenoid, and
  (iii) a driver blade for driving fasteners connected to said plunger;
 (b) a handle portion projecting rearwardly from said head portion having trigger means for actuating the tool;
 (c) a magazine portion for holding a plurality of fasteners and for advancing said fasteners in position for driving engagement with said driver blade, said magazine portion connected to said head portion;
 (d) an electronic trigger control circuit for supplying the solenoid with a predetermined plurality of unidirectional current pulses each time the trigger means is actuated for impelling the driver blade to provide a like number of driving strokes to a single fastener in response to each actuation of the trigger means; and
 (e) means for preventing more than one fastener from being driven during a single actuation of the tool by preventing the advancement of a second fastener into the axial path of the driver blade while a first fastener is being driven with a plurality of strokes of the driver blade.

2. In an electrically powered fastener driving tool having a hollow body comprising:
 (a) an elongated head portion having a hollow interior housing an armature assembly which includes:
  (i) a solenoid,
  (ii) a plunger which fits within and slides axially of said solenoid, said plunger having a flanged cap at its upper end, a driver blade for driving fasteners connected thereto at its lower end and
  (iii) resilient means upwardly biasing said plunger;
 (b) a hollow handle portion projecting rearwardly from said head portion having an electronic trigger control circuit mounted therein for producing a predetermined plurality of driving strokes to a fastener for each actuation of the tool;
 (c) a magazine portion for holding a plurality of fasteners and for advancing said fasteners in position for driving engagement with said driver blade, said magazine portion secured to said head portion; and
 (d) means for impeding retraction of the driver blade between strokes such that it blocks the advancement of a second fastener into the axial path of said driver blade while a first fastener is being driven comprising:
  (i) a dashpot assembly including a dashpot cup which is movably connected at the bottom thereof to said plunger cap, said dashpot cup fitting slidably within a cylindrically-shaped interior enclosure seated upon said solenoid within the head portion of the tool for axial wiping movement against the circumferential wall of said enclosure, said cup having at least one hole at the bottom thereof to provide for the flow of air therethrough during the downward driving stroke of the plunger upon actuation of the tool, and an air release port provided in said interior enclosure for controlled release of air during retraction of the plunger.

3. The fastener driving tool according to claim 2 in which said dashpot cup has a plurality of holes at the bottom thereof.

4. The fastener driving tool according to claim 2 in which said dashpot cup is of thermoplastic composition.

5. The fastener driving tool according to claim 3 in which said dashpot cup is connected to said plunger cap by tubular shoulder rivets.

6. An electrically powered fastener driving tool having a hollow body comprising:
 (a) an elongated head portion housing an armature assembly which includes:
  (i) a solenoid,
  (ii) a plunger which fits within and slides axially of said solenoid, and
  (iii) a driver blade connected to said plunger for driving said fasteners;
 (b) a hollow handle portion projecting rearwardly from said head portion having trigger means and an electronic trigger control circuit mounted therein for producing a predetermined plurality of driving strokes to a fastener in response to actuation of said trigger means;

(c) a magazine for holding a plurality of fasteners secured to said head portion and for advancing said fasteners in position for driving engagement with said driver blade; and (d) means for preventing the advancement of a second fastener into the axial path of said driver blade while a first fastener is being driven comprising:
   (i) a clamp having an aperture therein,
   (ii) a pivotable lever member mounted for rotation about a pivot, said pivotable lever member having two elongated end portions including a forward projecting tang portion for engagement with said clamp through the aperture therein and a rearward projecting arm portion for engagement with said trigger means,
   (iii) blocking means secured to said trigger means in fixed relation thereto, said blocking means preventing downward movement of said tang portion when said trigger means is in its rest position, and
   (iv) resilient means connecting said arm portion of said lever member with said blocking means and urging it upward against sad blocking means whereby actuation of said trigger means causes said lever member to rotate, said arm portion thereof urged upward by said resilient means against said blocking means and said tang portion moved downward against said clamp to force said clamp into pressing engagement with a fastener in said magazine thereby preventing its advancement into the axial path of said driver blade.

7. The fastener tool according to claim 6 further comprising:
   a backing plate having an elongated aperture located generally centrally therein, the backing plate being interposed between the path of the driving blade and said clamp.

8. The fastener tool according to claim 7 wherein said magazine comprises:
   a sheath and a pair of side plates wherein said side plates are connected to said sheath by said pivot.

9. The fastener tool according to claim 8 wherein the forward portion of each of said side plates comprises:
   means for preventing rearward movement of said clamp.

10. The fastener driving tool according to claim 6 which further comprises:
    at least one tang at the bottom edge of said clamp for pressing engagement with a fastener.

11. The fastener driving tool according to claim 10 in which the bottom edge of said tang is configured so as to squarely engage the top of a fastener.

12. The fastener driving tool to claim 11 wherein said tang is in angular relationship with said clamp.

* * * * *

UNITED STATES PATENT AND TRADEMARK OFFICE
CERTIFICATE OF CORRECTION

PATENT NO. : 4,183,453
DATED : January 15, 1980
INVENTOR(S) : Edward E. Barrett et al.

It is certified that error appears in the above-identified patent and that said Letters Patent are hereby corrected as shown below:

In the Specification

Col. 3, line 46, "D2" should read -- D3 --.

Col. 7, line 39, "tang 52 operation" should read -- tang 52 during operation --.

In the Claims

Col. 9, line 27, "sad" should read -- said --.

Signed and Sealed this

Twenty-ninth Day of April 1980

[SEAL]

Attest:

SIDNEY A. DIAMOND

Attesting Officer

Commissioner of Patents and Trademarks